United States Patent [19]

Kuboshima

[11] 4,063,261

[45] Dec. 13, 1977

[54] VIEW FINDER OPTICAL SYSTEM

[75] Inventor: Makoto Kuboshima, Tokyo, Japan

[73] Assignee: Fuji Photo Film Co., Ltd., Japan

[21] Appl. No.: 741,963

[22] Filed: Nov. 15, 1976

[30] Foreign Application Priority Data

Nov. 14, 1975 Japan .............................. 50-136996

[51] Int. Cl.² ............................................ G03B 13/08
[52] U.S. Cl. .................................. 354/225; 354/155; 354/201; 350/286
[58] Field of Search ............... 354/155, 225, 224, 219, 354/200, 201, 56; 350/286

[56] References Cited

U.S. PATENT DOCUMENTS 2,323,005   6/1943   Bertele .................... 354/225

FOREIGN PATENT DOCUMENTS 58,001   9/1967   Germany ..................... 354/155

Primary Examiner—John Gonzales

[57] ABSTRACT

A view finder optical system suitable for use in a single or twin lens reflex camera, using an image erecting-and-reflecting optical element. This optical element functions to change the image to be photographed appearing on the focusing plate of the camera to an erect real image which stands at a proper distance from the eyepiece of the camera. This makes it possible to increase the magnification of the view finder as much as required simply by using a short focal length eyepiece.

7 Claims, 8 Drawing Figures

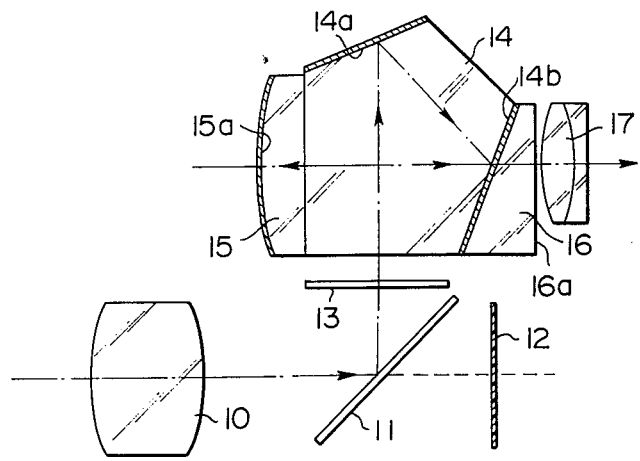
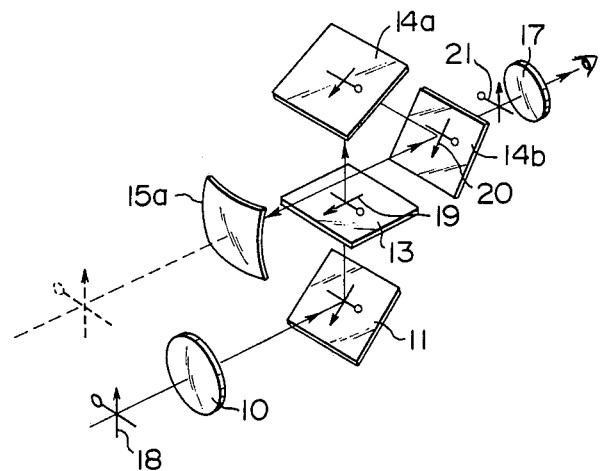
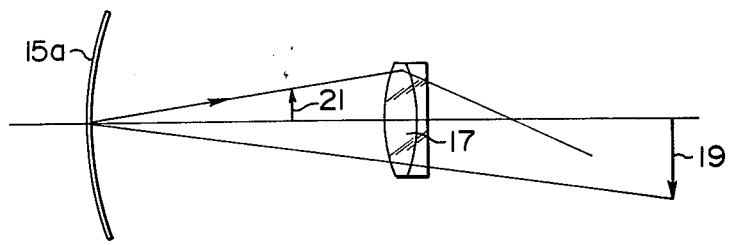

VIEW FINDER OPTICAL SYSTEM

BACKGROUND OF THE INVENTION

1. Field of the Invention

This invention relates to a view finder optical system for a single lens or twin lens reflex camera.

2. Description of the Prior Art

One type of view finder optical system of the type which has been widely used in single lens or twin lens reflex cameras has a pentagonal dach prism above a focusing plate and an eyepiece behind the pentagonal dach prism. The pentagonal dach prism is capable of changing the inverted image to be photographed appearing on the focusing plate to a corresponding erect image which can be seen through the eyepiece. As is well known, the magnification of the view finder is determined by the ratio of the focal length of the taking lens to the focal length of the eyepiece, and therefore the magnification of the view finder increases inversely with the focal length of the eyepiece.

However, as a natural consequence of using a cemented type eyepiece of short focal length, there is entailed the necessity of shortening the distance between the eyepiece and the focal plate. On the other hand, the size of the pentagonal dach prism cannot be reduced too much because undesired reduction of the viewing area would result. Therefore, the distance between the eyepiece and focusing plate cannot be reduced to less than a certain allowable length which is defined by the size of the intervening pentagonal dach prism. This means that in a view finder optical system including a pentagonal dach prism, it is very difficult to increase the magnification of the view finder by simply using a cemented type eyepiece of short focal length. One way to solve this difficulty is to use a special eyepiece having a short focal length as well as a desired back focal length in the view finder optical system. Such a special eyepiece, however, consists of a large number of lens elements, and is accordingly expensive.

SUMMARY OF THE INVENTION

In view of the above defects the primary object of this invention is to provide a view finder optical system in which the magnification of the view finder can easily be made large as required.

To attain this object a view finder optical system according to this invention comprises: a reflecting plane lying above a focusing plate so as to reflect back and downward the rays of light from the focusing plate; a semi-transparent plane to receive the light from the reflecting plane and direct the reflected light forward and parallel to the focal plane; and an image erecting-and-reflecting optical means positioned in the optical path of the light from the semi-transparent plane as to receive the light from the semi-transparent plane and reflect the same back thereto, thereby forming an erect real image corresponding to the image of the object to be photographed appearing on the focal plane, said erect image standing in front of the eyepiece and being visible through the eyepiece. In a view finder optical system according to this invention, the image erecting-and-reflecting optical means is used to form an erect real image at a proper position in front of the eyepiece. In this connection, the curvature of the surface of said image erecting-and-reflecting means is determined so as to be in conformity with the focal length of the eyepiece. This makes it possible to use cemented type eyepieces within a great range of focal length. As a result, the magnification of the view finder can be increased simply by using an eyepiece of short focal length rather than a special and complicated one such as mentioned hereinbefore.

Such an image erecting-and-reflecting means may be a concave mirror, a combination of a plane mirror and a positive Fresnel lens, a combination of a plane mirror and a cemented positive lens, or a cemented positive lens having one side modified in the form of a reflecting surface.

BRIEF DESCRIPTION OF THE DRAWINGS

FIG. 1 is a longitudinal sectional view of a single lens reflex camera to which a view finder of this invention is applied, FIG. 2 is a schematic perspective view showing the manner in which the view finder system forms an erect real image, FIG. 3 is a schematic side view showing the manner in which an image erecting-and-reflecting means functions to form a virtual image.

DESCRIPTION OF THE PREFERRED EMBODIMENTS

Figure 4:
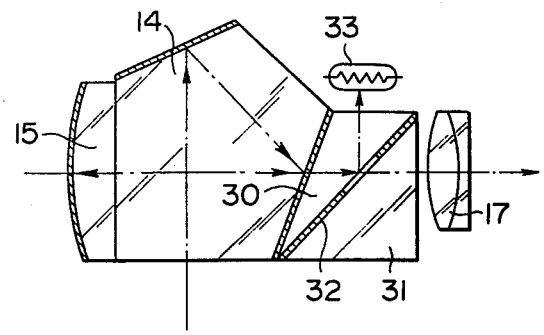
FIG. 4 is a longitudinal sectional view of another embodiment in which a photodetector is located in such a position that allows TTL light measurement in the camera.

FIG. 1 shows a single lens reflex camera in which a view finder optical system according to this invention is employed. A rotatable reflecting mirror 11 is provided, behind a taking lens 10 and is inclined at 45° with respect to the optical axis of the taking lens 10. A focusing plate 13 is positioned above the reflecting mirror 11 at an optical conjugate position with respect to a film 12. A pentagonal dach prism 14 is provided above the focusing plate 13. As shown in the drawing, the inclined top surface of the prism 14 is plated or coated with a reflecting material to provide a reflecting surface 14a. Also, a semitransparent surface 14b is formed on the part of the prism which receives the light from the reflecting surface 14a, and the semitransparent surface 14b passes the light forward in a direction parallel to the focusing coated 13. An image erecting-and-reflecting prism 15 having a spherical surface plated so as to provide an image erecting-and-reflecting surface 15a, is attached to the front of the pentagonal dach prism 14. The coated spherical surface 15a functions as a concave mirror. Also, as shown in the drawing a triangular prism 16 is attached to the rear side of the pentagonal prism just behind the semi-transparent surface 14b, and the rear surface 16a of the triangular prism 16 constitutes an exit plane which is perpendicular to the optical path of the light reflected by the concave mirror 15a. A cemented type lens 17 is provided behind the triangular prism 16 to serve as an eyepiece through which can be observed the erect image which is formed by the image erecting-and-reflecting prism 15.

The manner in which the view finder optical system forms an erect image is explained below with reference to FIGS. 2 and 3. The light from on object 18 to be photographed passes through the taking lens 10 and is focused on the focusing plate 13 via the reflecting mirror 11. A "left-side-right" inverted image 19 is formed on the focusing plate 13. The light from the focusing plate 13 is reflected back and downward by the reflecting surface 14a of the pentagonal dach prism 14 and reflected by the semi-transparent surface 14b causing an inverted image 20 to appear on the semi-transparent surface 14b. The light reflected by the semi-transparent surface 14b is reflected by the concave reflecting surface 15a of the prism 15. The reflected light passes through the semi-transparent surface 14b and advances to the eyepiece 17.

As shown in FIG. 3, the image erecting-and-reflecting surface 15a functions as a concave mirror, thus changing the image on the focusing plate to an erect real image 21 standing in front of the eyepiece 17, and this real image 21 can be seen through the eyepiece 17 in the form of an enlarged virtual image 19.

FIG. 4 shows another embodiment of the invention in which a photodetector is positioned so as to allow TTL (through the taking lens) light measurement. In this embodiment, two triangular prisms 30 and 31 are fixed to each other and the whole area of the joint surface of the integrated prisms 30 and 31 or the circumferential area enclosing the center of the joint surface constitutes a semi-transparent surface 32 which functions to direct a part of the light to the photodetector 33.

Figure 5:
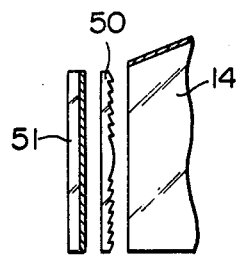
FIGS. 5 to 7 are side views showing different examples of the image erecting-and-reflecting means.
Figure 6:
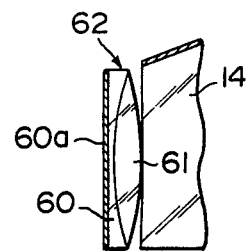
Figure 7:
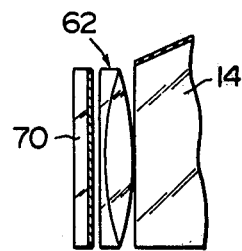
Figure 8:
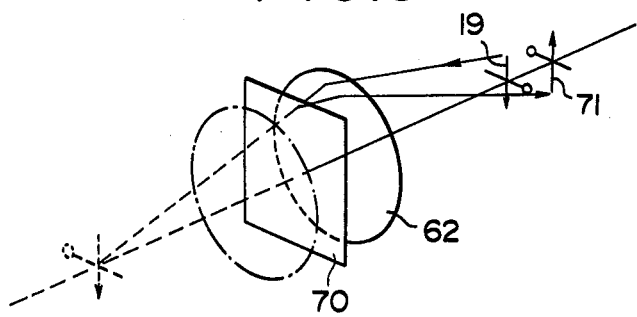
FIG. 8 is a schematic perspective view showing the manner in which the image erecting-and-reflecting means of FIG. 7 forms an erect image.

FIGS. 5 to 7 show different examples of the image erecting-and-reflecting optical means. The first, as shown in FIG. 5, comprises a Fresnel lens 50 and a plane mirror 51. The second, shown as 62 in FIG. 6, uses a combination of a plane concave lens 60 and a convex lens 61 cemented together. As shown, the plane side of the planoconcave lens is plated to provide a reflecting surface 60a. In the third example shown in FIG. 7, a separate plane mirror 70 is provided behind a cemented lens 62. As shown in FIG. 8, the plane mirror 70 and the cemented lens 62 function together to turn the image 19 on the focusing plate 13 upside down and left side right, thereby forming an erect real image 71.

The embodiments as shown in FIGS. 1 and 4 use a prism having reflecting surfaces. Instead of such a prism, reflecting mirrors may be used at the same positions as the reflecting surfaces of the pentagonal prism. If such reflecting mirrors are used, the weight of the view finder system is decreased, and still advantageously the cost for manufacturing is reduced.

As mentioned above, a view finder optical system of this invention uses, in place of a conventional pentagonal dach prism, an image erecting-and-reflecting optical means which is capable of forming an erect real image in front of the eyepiece. Owing to this, the magnification of the view finder is easily increased by simply using a short focal length eyepiece.

I claim:

1. A view finder optical system for a reflex camera having a focusing plate on the top thereof comprising a reflecting surface lying above the focusing plate for reflecting backward and downward the light from the focusing plate, a semi-transparent plane for reflecting the light from the reflecting surface forward in parallel to the face of the focusing plate, an image erecting-and-reflecting optical means positioned ahead of the semi-transparent plane to reflect the light therefrom backward thereto for forming an erect image behind the semi-transparent plane, and an eyepiece positioned behind the semi-transparent plane for viewing the erecting image therethrough.

2. A view finder optical system as defined in claim 1 wherein said reflecting surface consists of a plated face of a pentagonal dach prism, said semi-transparent surface consists of another face of the pentagonal dach prism, and said image erecting-and-reflecting optical means comprises a spherical-plane prism element the spherical surface of which is plated and the plane surface of which is fixed to a plane surface of the pentagonal prism opposite to said another face thereof.

3. A view finder optical system as defined in claim 2 further comprising two triangular prism elements cemented to each other, the whole area of the joint surface of the cemented triangular prism elements being semi-transparent, and the cemented prism elements being fixed to said semi-transparent surface of the pentagonal prism.

4. A view finder optical system as defined in claim 1 wherein said reflecting surface is a plated face of a pentagonal dach prism, said semi-transparent surface is another face of the pentagonal prism, and said image erecting-and-reflecting optical means comprises a combination of a Fresnel lens and a plane mirror.

5. A view finder optical system as defined in claim 1 wherein said reflecting surface is a plated face of a pentagonal dach prism, said semi-transparent surface is another face of the pentagonal prism, and said image erecting-and-reflecting optical means comprises a combination of planoconcave lens and a convex lens cemented together the plane surface of the cemented lens being plated.

6. A view finder optical system as defined in claim 1 wherein said reflecting surface is a plated face of a pentagonal dach prism, said semi-transparent surface is another face of the pentagonal prism, and said image erecting-and-reflecting optical means comprises a combination of a plane mirror and a cemented planoconvex lens.

7. A view finder optical system as defined in claim 1 wherein said reflecting surface, said semi-transparent plane and said image erecting-and-reflecting optical means are all plane reflecting mirrors.

* * * * *